(12) United States Patent  
Mahafza

(10) Patent No.: US 7,969,344 B1
(45) Date of Patent: Jun. 28, 2011

(54) METHODS AND SYSTEMS FOR IMPROVED EXTRACTION OF A SIGNAL FROM A NOISY ENVIRONMENT

(75) Inventor: Bassem R. Mahafza, Huntsville, AL (US)

(73) Assignee: COLSA Corporation, Huntsville, AL (US)

( * ) Notice: Subject to any disclaimer, the term of this patent is extended or adjusted under 35 U.S.C. 154(b) by 3256 days.

(21) Appl. No.: 09/736,850

(22) Filed: Oct. 5, 2000

(51) Int. Cl.
*G01S 7/292* (2006.01)
*G01S 13/534* (2006.01)

(52) U.S. Cl. .......... 342/13; 342/159; 342/160; 342/163; 342/194; 342/21

(58) Field of Classification Search .......... 342/13, 342/15–19, 21, 159–163, 194–195
See application file for complete search history.

(56) References Cited

U.S. PATENT DOCUMENTS

| | | | |
|---|---|---|---|
| 3,950,616 A | | 4/1976 | Tammaru |
| 4,008,444 A | | 2/1977 | Zar et al. |
| 4,106,019 A | * | 8/1978 | Alexander et al. ............ 342/108 |
| 4,746,922 A | * | 5/1988 | Prenat ............................ 342/88 |
| 5,374,931 A | * | 12/1994 | Wiener ......................... 342/115 |
| 5,566,134 A | | 10/1996 | Default |
| 5,798,728 A | | 8/1998 | Tomishima et al. |
| 5,808,580 A | * | 9/1998 | Andrews, Jr. ................. 342/162 |
| 6,023,238 A | * | 2/2000 | Cornic et al. ................. 342/129 |
| 6,111,537 A | | 8/2000 | Andersson .................... 342/137 |
| 6,353,578 B1 | * | 3/2002 | Wagstaff et al. .............. 367/125 |
| 7,064,704 B2 | * | 6/2006 | Bergkvist ...................... 342/160 |

OTHER PUBLICATIONS

Robert I. Collier, et al., *Optical Holography*, Bell Telephone Laboratories, Inc., Academic Press, 1971, pp. 23-26, 414-417.
Bernard L. Lewis, et al., *Aspects of Radar Signal Processing*, Artech House, Inc., 1986, pp. 4-6.
Sophocles J. Orfanidis, *Optimum Signal Processing: An Introduction*, McGraw-Hill Publishing Company, Rutgers University, 1998, pp. 99-114.
J. Patrick Reilly, *Moving Target Indicators (MTI)*, Radar Design Principles: Signal Processing and the Environment, Mc-Graw-Hill, Inc., Chapter 9, pp. 387-412.

* cited by examiner

*Primary Examiner* — John B Sotomayor
(74) *Attorney, Agent, or Firm* — Finnegan, Henderson Farabow, Garrett & Dunner

(57) ABSTRACT

Methods and systems consistent with the present invention allow identification of a true signal contained in a signal containing the true signal and noise. In general, digital signal information representing a signal of interest plus noise is utilized by the present invention. The first N samples of digital signal information are stored with the Nth sample being stored in manner which renders it accessible for additional operations. A specially selected set of weights are applied to the buffered N samples and, additionally, phase rotation is applied to the Nth sample. The phase rotated Nth sample and weighted samples are combined using a first equation, described in more detail below. The resulting signal, which exhibits an increased Signal-to-Noise ratio (SNR) and may be more effectively utilized in subsequent MTI processing by virtue of the operations performed on the previous N samples as described herein, is then available for further processing using conventional techniques.

24 Claims, 6 Drawing Sheets

METHODS AND SYSTEMS FOR IMPROVED EXTRACTION OF A SIGNAL FROM A NOISY ENVIRONMENT

FIELD OF THE INVENTION

The present invention relates generally to signal processing methods and systems, more particularly, to methods and systems for improving the signal-to-noise plus interference ratio of a signal in a noise/interference background.

BACKGROUND

The problem of extracting a usable signal from a noisy environment is a common one in the field of signal processing. Noise is generally defined as an unwanted or interfering component that degrades system performance and detracts from the processing of the desired signal. Noise may be provided by numerous sources both external and internal to a signal processing device or receiver. In some applications, an incoming signal may be corrupted by strong additive noise such as, for example, weak radar echoes from a target in the presence of strong background clutter. In some cases, signals traveling over existing communications systems experience phase and amplitude distortions from channel noise that is internal to the receiving device, much like tinnitus in the human ear or thermal noise in an optical or radio frequency (RF) detector. In still other applications, noise may be introduced into a received signal by deliberate and intentional interference, such as in jamming. Jamming is any intentional or deliberate signal interference utilized by hostile forces to disrupt normal receiver operation.

Because of the noise presence, receiving systems generally exhibit a sensitivity threshold that limits the processing of signals to those which exceed the noise level. The utilization of information contained in signals that are obscured or contaminated by noise is limited by the ability of the receiver processing device to separate the signal components from the noise, eliminate the noise component, or enhance the signal to a level in excess of the noise to permit the extraction of the desired information.

Radar performance, in particular, may be severely degraded in the presence of noise, "clutter," jamming or chaff. Clutter is a term used to describe the return emanating from objects which tend to obscure the signal associated with the "true" target return. Clutter can be classified in two main categories: surface clutter and airborne or volume clutter. Surface clutter includes the radar return from trees, vegetation, ground terrain, man-made structures and the sea surface. Volume clutter may be produced by large ensembles of airborne scatterers such as that associated with chaff, rain, birds, and insects. Chaff consists of a large number of small dipole reflectors that have large radar cross section (RCS) values. It may be released by hostile aircrafts or missiles as a means of an electronic countermeasure (ECM) in an attempt to confuse a radar. Clutter is particularly troublesome for most radar detection systems because it introduces a noise-like return with a random phase and amplitude that is may exceed that of the received signal. Unlike clutter, so-called "white noise" generally introduces the same amount of noise power density across the entire operating bandwidth of the radar.

There are several known techniques for extracting signal information from noisy environments caused by one or more of the situations described above. Known techniques include, for example, matched filtering, Kalman/Weiner filters, moving target indicator (MTI) systems, and coherent integration. Each of these techniques, while suitable for some applications, suffers from limitations, as described in more detail below. All of these techniques are described in more detail in Bassem R. Mahafza, "Introduction to Radar Analysis" (CRC Press, 1998) and in Bassem R. Mahafza, "Radar Systems Analysis and Design Using MATLAB" (CRC Press, 2000).

In a system which utilizes a matched filter, the signal-to-noise ratio (SNR) of the receiver output is enhanced by or through correlation of the received signal with the transmitted wave form. In a radar system, for example, a received signal consists of an amplitude weighted and time delayed version of the transmitted signal plus noise. The receiver processes a replica of the transmitted signal together with the received signal to determine the correlation between the two signals. Maximum correlation indicates the location of the desired signal, i.e. the "true" target return, within the receiver time window. While matched filtering may work in many situations, it may be inadequate in clutter, chaff, and jamming environments. In these situations, the amount of interference signal is so overwhelming that processing requires prohibitive pulse lengths or system band widths to recover the true signal from the background interference.

Kalman filters use Markov processes to estimate the desired signals and, as such, are difficult to implement because of the mathematics involved. Furthermore, the proper selection of gain parameters requires accurate a priori knowledge of the target dynamics and is not straight-forward. Weiner filters, a subclass of Kalman filters, are effective with thermal background noise but are not generally effective against clutter or jammer returns.

In coherent integration systems, otherwise known as pulse integration systems, coherent radar signals are added together to increase the SNR. Two or more radar signals are said to be coherent if the amplitudes and relative phases of the signals have a known relationship even though they may be separated in time. If the noise is uncorrelated, the SNR increases linearly with the number of signals integrated by the processor. The accuracy of these systems are limited by their ability to integrate a sufficient number of samples over an extended period of time since fluctuations in the amplitude and phase of the target return may cause the desired signal to decorrelate and become noncoherent.

In moving target indicator (MTI) systems, delay-line cancelers are used to suppress target-like return signals produced by clutter, and allow return signals from desired targets to pass through with little degradation. Clutter is distinguishable from receiver noise by its relatively low-frequency, narrow spectrum. An MTI system cancels the clutter return from the incoming signal by subtracting successive echoes from the same location. The problem with MTI systems is that they exhibit "blind speeds," corresponding to Doppler frequencies for which the radar is unable to detect targets.

FIG. 1 depicts the output gain of a three-pulse MTI canceller along the vertical axis with frequency shown along the horizontal axis. As shown in FIG. 1, blind speeds occur when the target velocity results in a Doppler frequency equal to an integer multiple of the radar pulse repetition frequency which, in this example, is at 100 Hz, 200 Hz, 300 Hz, etc. A target, having a relative velocity corresponding to a Doppler frequency equal to an integer multiple of the pulse repetition frequency, will not be detected. Another limitation of MTI systems is that the pass band response (gain) may vary widely over the bandwidth of interest which masks the effects of a change in the target velocity.

The performance of MTI systems can be improved by increasing the number of delay lines. FIG. 2 shows an example of a MTI system with multiple delay-line cancelers and a weighted summer. As shown in FIG. 2, the signal is tapped at multiple locations at even intervals delay time, T, seconds apart. The delayed pulses are weighted by binomial or other coefficients and then added together to produce the output of the MTI filter.

The performance of this type of MTI system is known to be dependent on the choice of weighting coefficients. There are numerous methods for choosing the weights, some of which are discussed in Fred E. Nathanson, "Radar Design Principles," (McGraw-Hill Inc., 1991, 2nd ed.), pp. 410-12. One common weighting scheme is to choose weights that are binomial coefficients (coefficients of the expansion $(1+a)^n$) with alternating signs. Notwithstanding the effectiveness of MTI filters with binomial coefficients, these systems still exhibit blind speeds and wide pass-band (gain) fluctuations may mask the effects of changes in the target velocity. Therefore, research continues to define alternate weighting schemes and associated coefficients to minimize the effect of blind speeds and provide a better pass-band response.

SUMMARY OF THE PRESENT INVENTION

Methods and systems consistent with the present invention allow identification of a true signal contained in a signal containing the true signal and noise. In general, digital signal information representing a signal of interest plus noise is utilized by the present invention. The first N samples of digital signal information are stored with the Nth sample being stored in manner which renders it accessible for additional operations. A specially selected set of weights are applied to the buffered N samples and, additionally, phase rotation is applied to the Nth sample. The phase rotated Nth sample and weighted samples are combined using a first equation, described in more detail below. The resulting signal, which exhibits an increased Signal-to-Noise ratio (SNR) and may be more effectively utilized in subsequent MTI processing by virtue of the operations performed on the previous N samples as described herein, is then available for further processing using conventional techniques.

BRIEF DESCRIPTION OF THE DRAWINGS

The accompanying drawings, which are incorporated in and constitute a part of this specification and, together with the description, serve to explain the advantages and principles of the invention.

DETAILED DESCRIPTION

A. Overview

Methods and systems consistent with the present invention allow detection of a signal contained in a noise environment. In general, a received analog signal containing information of interest immersed in a noise/interference background is coherently processed to resolve it into its complex quadrature components. The quadrature components of the analog signal are sampled at predetermined time intervals, $\Delta t$, and, through an analog-to-digital converter, expressed as a digital stream of the sampled signal quadrature components. N consecutive samples of the digitized signal quadrature components are stored. A specially selected set of weighting coefficients are applied to the samples. Additionally, phase rotation is applied to the last, i.e., Nth sample. The phase-rotated Nth sample and the N weighted samples are combined using Equations 1 through 4 described in more detail below. The resulting modified signal may then be processed by conventional signal processing means. A next set of N samples are then processed as described above to yield modified signals every $\Delta t$.

The present invention is an improvement over prior art systems previously mentioned because, while simple to implement, it can be easily integrated into existing systems. The present invention allows for fast and accurate detection of signals that other systems can not detect or which may only be able to detect after a lengthier processing period or by using a complex processing scheme. Furthermore, methods consistent with the present invention may be used to improve the detection of signals in a broad range of applications, including but not limited to radar systems and other communication systems. Methods consistent with the present invention may be used to improve signal detection in optical and sonar devices.

Reference will now be made in detail to exemplary embodiments of the invention that are also illustrated in the accompanying drawings. The present invention may be implemented using hardware, software or a combination of hardware and software. The description includes exemplary embodiments, other embodiments are possible, and changes may be made to the embodiments described without departing from the spirit and scope of the invention. Wherever possible, the same reference numbers will be used throughout the drawings to refer to the same or like parts.

B. Method

One embodiment of the present invention consists of a radar processing method which provides significant enhancement of the SNR at the receiver device through a unique type of coherent processing. More specifically, one embodiment of the present invention comprises performing a special weighted averaging of the quadrature components for a number of pulses. The method of the present invention produces new estimates of the pulses removing from the signals a significant portion of the spatially incoherent components emanating from noise, clutter, or jamming sources.

Figure 1:
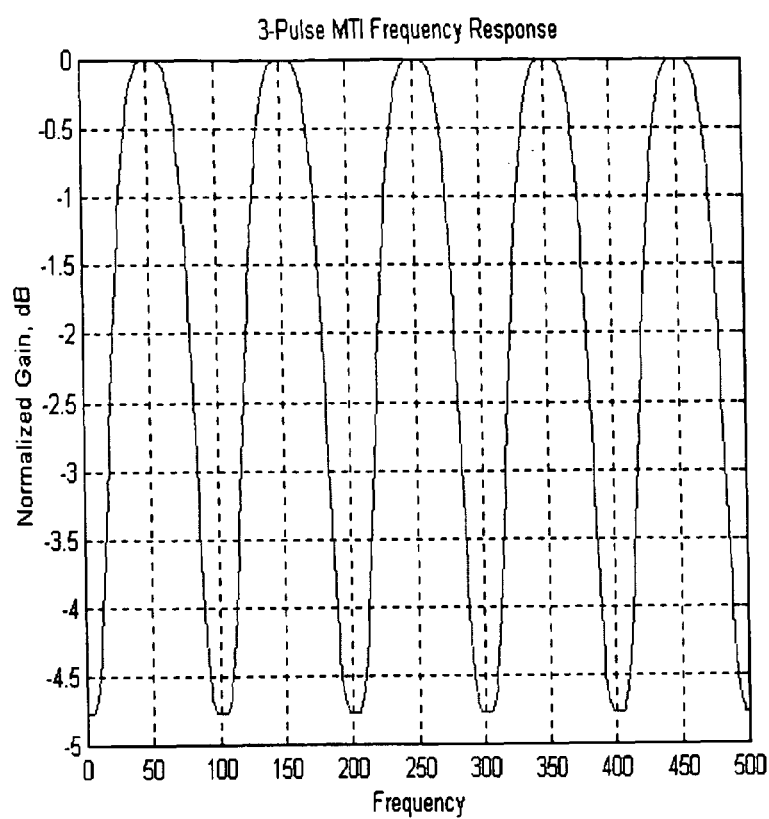
FIG. 1 is a graph showing the output of a three-pulse MTI canceller indicating blind speeds.
Figure 2:
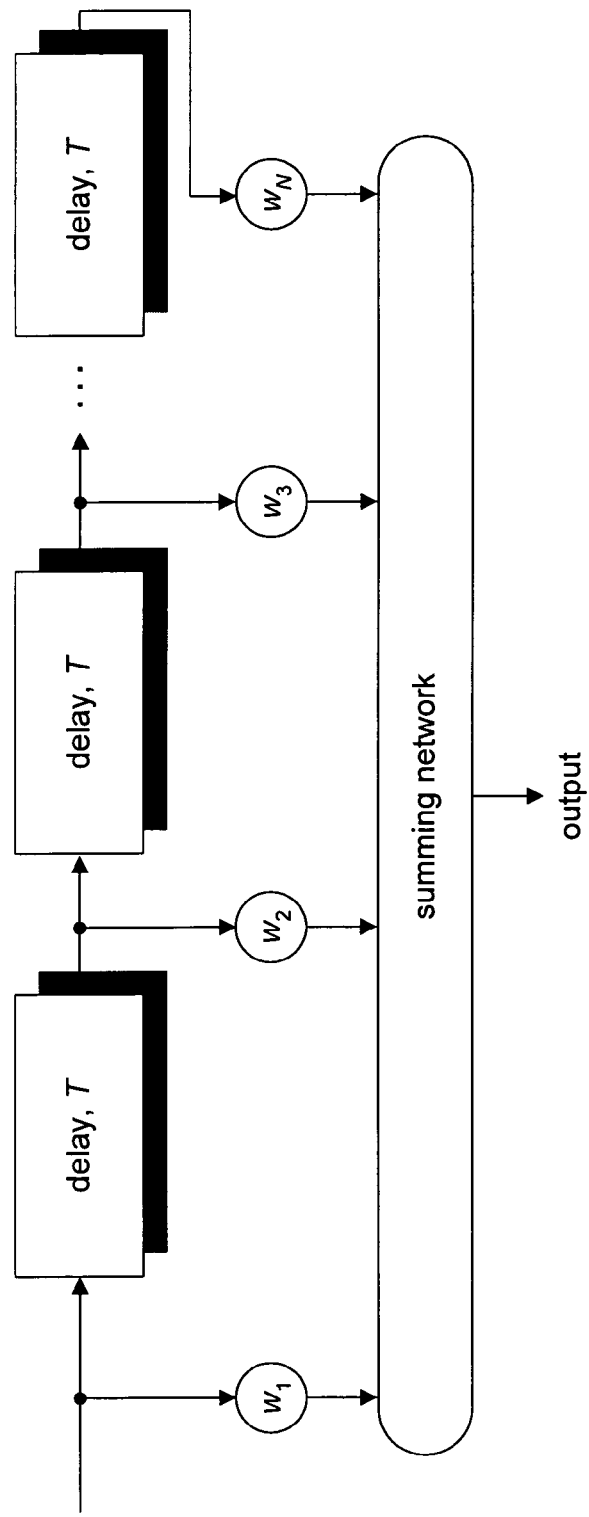
FIG. 2 is a block diagram of a MTI system with multiple delay-line cancelers and a weighted summer.
Figure 3:
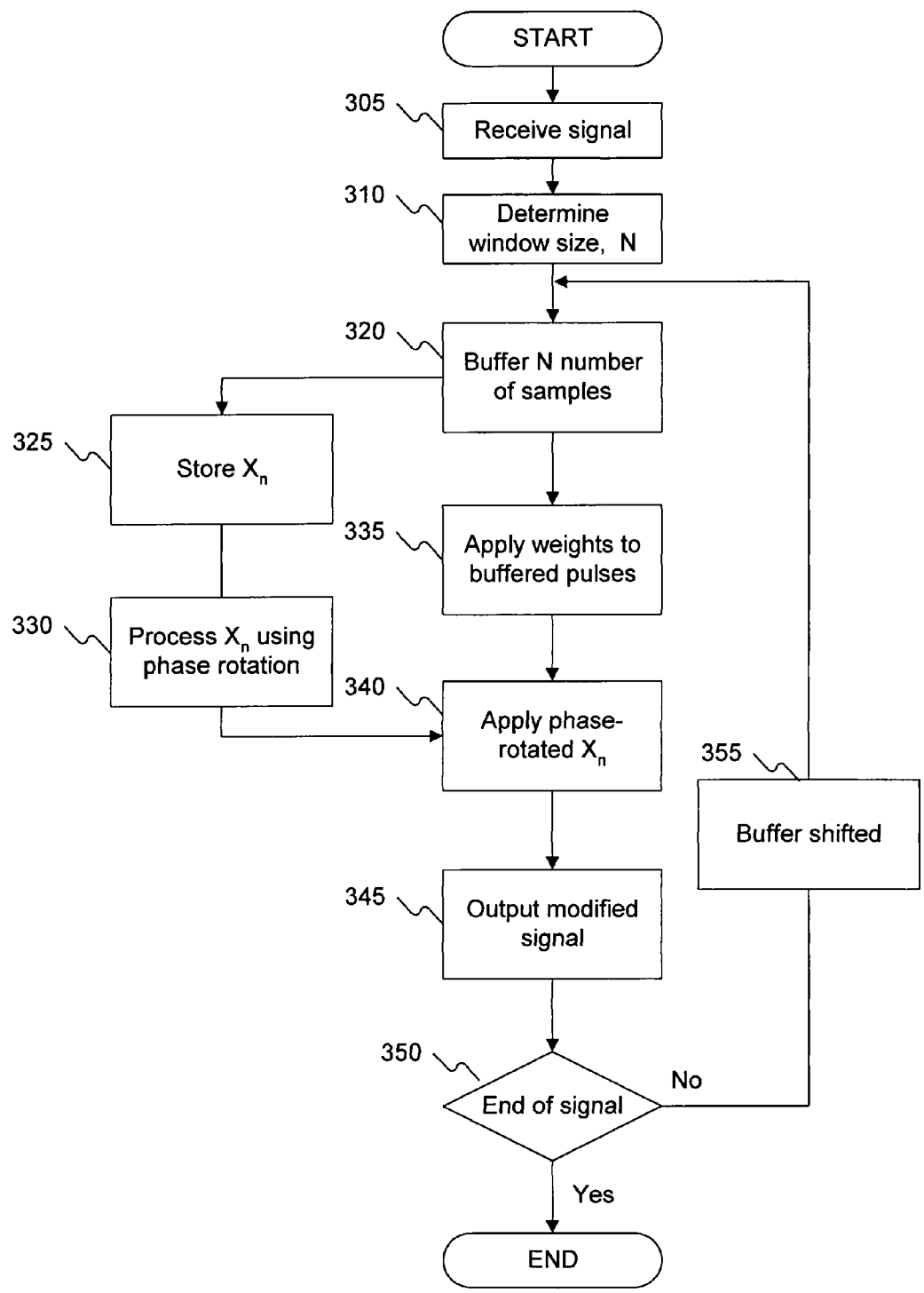
FIG. 3 is a flow chart illustrating a method for improving signal-to-noise ratio (SNR) in a signal containing noise consistent with the present invention.

FIG. 3 is a flow diagram of a method for detecting a desired signal in a signal containing the desired signal and noise consistent with the present invention. In a radar application, the analog radar signal is received (step 305). The received radar signal may be expressed in the form $x(t)=A(t)e^{j[\omega_0 t+\phi(t)]}$, where $\omega_0$ is the intermediate carrier frequency (IF) of the radar and the A(t) and $\phi(t)$ represent the amplitude and phase modulation of the target return, respectively. The received radar signal is coherently processed to resolve it into its in-phase $x_I(t)$ and quadrature $x_Q(t)$ components given by $x(t)=x_I(t)+ix_Q(t)$. After coherent processing, the signal is converted to a digital format (step 310).

In step 315, the window size, $(N-1)\Delta t$ is determined. Window size is the time period over which the samples will be taken. Window size is a function of the application and is based on, for example, a sampling rate and the characteristics of the signal. For example, a smaller number of samples or a faster sampling rate may be required for a faster moving target to ensure that the target return does not completely decorrelate within the window. Initially, a window size may be set based on anticipated target dynamics or the known characteristics of a target of interest, however, the window size may also be adjusted manually or dynamically based on the characteristics of the incoming signal.

Figure 4:
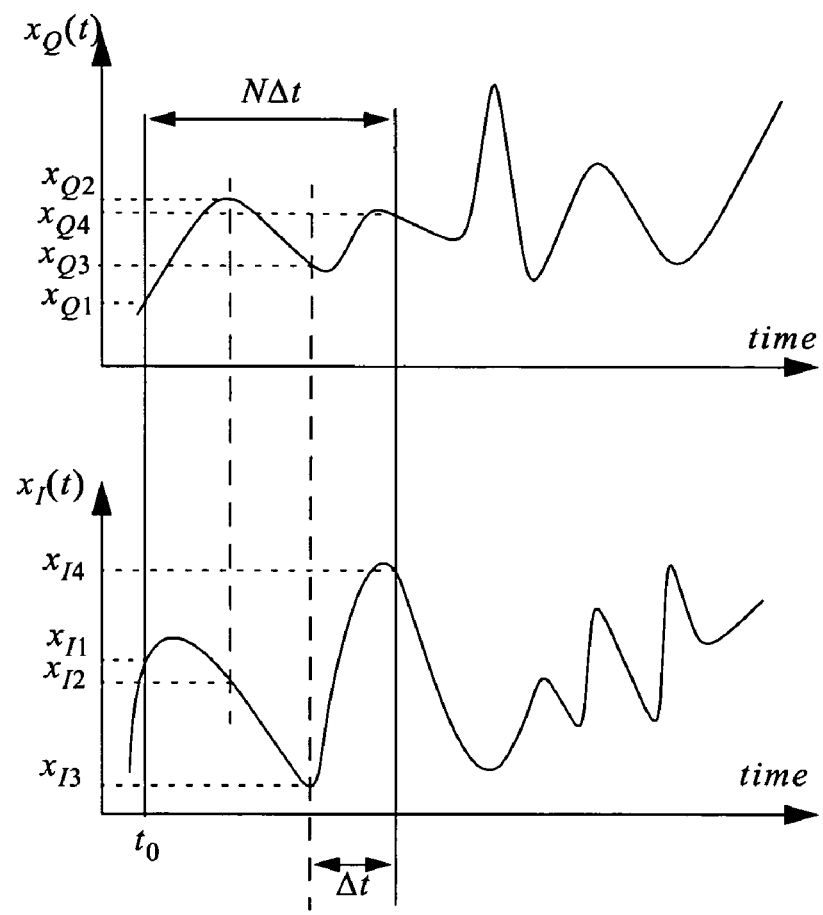
FIG. 4 shows one exemplary method for obtaining samples consistent with the present invention.

FIG. 4 shows one exemplary method for obtaining signal samples consistent with the present invention. The upper graph plots the in-phase component of the analog signal. The lower graph plots the quadrature component. In the example shown in FIG. 4, four samples are taken (N=4) every $\Delta t$ time period. The total window size therefore is $(N-1)\Delta t$. The sampling interval $\Delta t$ corresponds to the system's A/D sampling rate, which depends on the characteristics of the signal of interest. As stated above, the samples shown to the left of the graphs, $x_{I1}$ to $x_{I4}$ and $x_{Q1}$ to $x_{Q4}$ are the in-phase and quadrature components of the analog signal, x(t). Each of these samples may then be quantized, thereby converting the analog signal to digital format.

The N digital samples of the analog signal may be stored, for example, in memory (in a software implementation) or a shift register (in a hardware implementation) (step 320). Each sample consists of a pair of digital quadrature component values $x_I$ and $x_Q$, as shown in FIG. 4. If N=4, then complex samples $x_1$, $x_2$, $x_3$ and $x_4$ are stored. Those skilled in the art will recognize that the in-phase and quadrature components may be stored separately or together as x(t). Additionally, particularly in a hardware implementation, the last sample, $x_N$, which in this example is $x_4$, may be stored in a second buffer for further processing. (step 325).

The last sample, $x_N$, is processed using phase rotation (step 330). One type of phase rotation is described in Collier, Robert J., et al., "Optical Holography", (Academic Press, 1971), pp. 22-24. Phase rotation may be performed by, for example, calculating the conjugate in software or performing an equivalent bit manipulation in hardware.

In step 335, specially selected weighting coefficients, $M_i$, are applied to the stored samples. Each of the weighting coefficients belongs to a special class of integers that possess unique characteristics. Use of the unique relationships between these weights allows for maximizing the ratio of the desired signal power to the undesired signal power, that is, maximizing the SNR. In one embodiment of the present invention, the weighting coefficients are comprised of members of the class of integers described as Mersenne primes, or their reciprocals. A Mersenne prime is a prime number, $M_n$, where $M_n=2^n-1$ and n is also a prime number. The set of Mersenne primes, $\{M_n\}$, includes {3, 5, 7, 13, 17, 19, 31, 61, 89, 107, 127, 521, 607, 1279, 2203, 2281, 3217, 4253, 4423, 9689, 9941, 11213, 19937, 21701, 23209, 44497, 86243, 110503, 132049, 216091, 756839, 859433, 1257787, 1398269, 2976221, 3021377, ...}. In one embodiment of the present invention, four consecutive Mersenne prime numbers are used.

The weights are applied by modifying the buffered signal samples with the weighting coefficients by mixing or multiplying.

In step 340, the processed last sample, $x_N$, is combined with all weighted samples to produce a new sample estimate, that is, modified signal, $y_N$. In methods consistent with the present invention, the phase rotated Nth sample and the N weighted samples are combined. A new estimates of the incoming signal samples is formed and declared by y, as described below for N=4. The first three sample estimates are:

$$y_1 = s_1 + v_1 = x_1 \qquad \text{Eq (1)}$$

$$y_2 = s_2 + v_2 = x_2 \qquad \text{Eq (2)}$$

$$y_3 = s_3 + v_3 = x_3 \qquad \text{Eq (3)}$$

where s is the desired signal return and v is additive uncorrelated noise with zero mean and variance $\sigma_v^2$ (noise power). Note that the desired signal s and the noise v are also spatially incoherent. More precisely, $E[s_i v_j^*]=0=E[v_i v_j^*]$, where $E[\ ]$ refers to the expected value operator and the asterisk denotes complex conjugation. Thereafter, for $i=N\geq 4$, the new samples $y_i$; $i\geq N=4$ are computed as follows $$y_i = x_i^* \left\{ \frac{x_i}{M_1} + \frac{y_{i-1}}{M_2} + \frac{y_{i-2}}{M_3} + \frac{y_{i-3}}{M_4} \right\} \qquad \text{Eq(4)}$$

where $M_1>M_2>M_3>M_4$ are weights as discussed further above. The term $x_i^*$ is the complex conjugate of $x_i$. In some embodiments of the present invention, the coefficients in Equation 4 take on alternating signs.

Denote the new complex sample estimates $y_i$ as $$y_i = \hat{s}_i + \hat{v}_i \qquad \text{Eq (5)}$$

It follows that the following is true $$E[s_i s_j^*] = E[\hat{s}_i \hat{s}_j^*] = E[s_i \hat{s}_j^*] = |s|^2 \qquad \text{Eq (6)}$$

which is the desired signal power. And that $$E[s_i v_j^*] = E[\hat{s}_i v_j^*] = E[s_i \hat{v}_j^*] = E[\hat{s}_i \hat{v}_j^*] = 0$$

$$E[\hat{v}_i v_j^*] = E[v_i \hat{v}_j^*] = 0 \text{ for all } (i,j) \qquad \text{Eq (7)}$$

$$E[v_i v_j^*] = E[\hat{v}_i v_j^*] = E[v_i \hat{v}_j^*] = E[\hat{v}_i \hat{v}_j^*] = 0 \text{ for all } (i \neq j)$$

$$E[v_i v_j^*] = E[\hat{v}_i \hat{v}_j^*] = \sigma_v^2 \text{ for } (i=j) \qquad \text{Eq (8)}$$

After combination, the resulting modified signal is output (step 345). The outputted signal may be stored or transmitted to a data processor for further processing of the signal using conventional techniques.

If the process detects the end of the signal stream (step 350), the process terminates. If there are more signal samples remaining to process, the buffers holding the signal samples are shifted (step 355). The last sample, $x_i$, is shifted out of the shift register and a new sample is stored. As long as there are more samples to be processed, in step 355, the buffer is shifted, and the process proceeds with processing the next set of N samples.

The present invention significantly enhances the SNR over conventional methods. The improvement in the SNR can be determined from $E[y_i]$. More precisely (for N=4), $$E[y_i] = E[(x_i)^* (m_1 x_i + m_2 y_{i-1} + m_3 y_{i-2} + m_4 y_{i-3})] \qquad \text{Eq (9)}$$

where $(m_i=1/M_i)$, for $l=1, 2, 3, 4$. Substituting $x_i=s_i+v_i$ and Equation 5 into Equation 9 yield $$E[y_i] = E[(s_i+v_i)^* \{(m_1(s_i+v_i) + m_2(\hat{s}_{i-1}+\hat{v}_{i-1}) + m_3(\hat{s}_{i-2}+\hat{v}_{i-2}) + m_4(\hat{s}_{i-3}+\hat{v}_{i-3})\}] \qquad \text{Eq (10)}$$

Utilizing Equations 6, 7, and 8 into Equation 10 gives $$E[y_i] = m_1|s|^2 + m_1 \sigma_v^2 + |s|^2(m_2+m_3+m_4) \qquad \text{Eq (11)}$$

It follows that the SNR is now computed as $$(SNR)_{dB} = 10 \times \log\left(\frac{m_1+m_2+m_3+m_4}{m_1}\right) \qquad \text{Eq(12)}$$

The ratio defined in Equation 12 is maximized when $(m_1+m_2+m_3+m_4) \gg m_1$. This condition is attained by selecting the weights $M_1$, $M_2$, $M_3$, $M_4$ as prime numbers. This ratio is further maximized when these weights are chosen from the class of prime numbers described in the foregoing.

Figure 5:
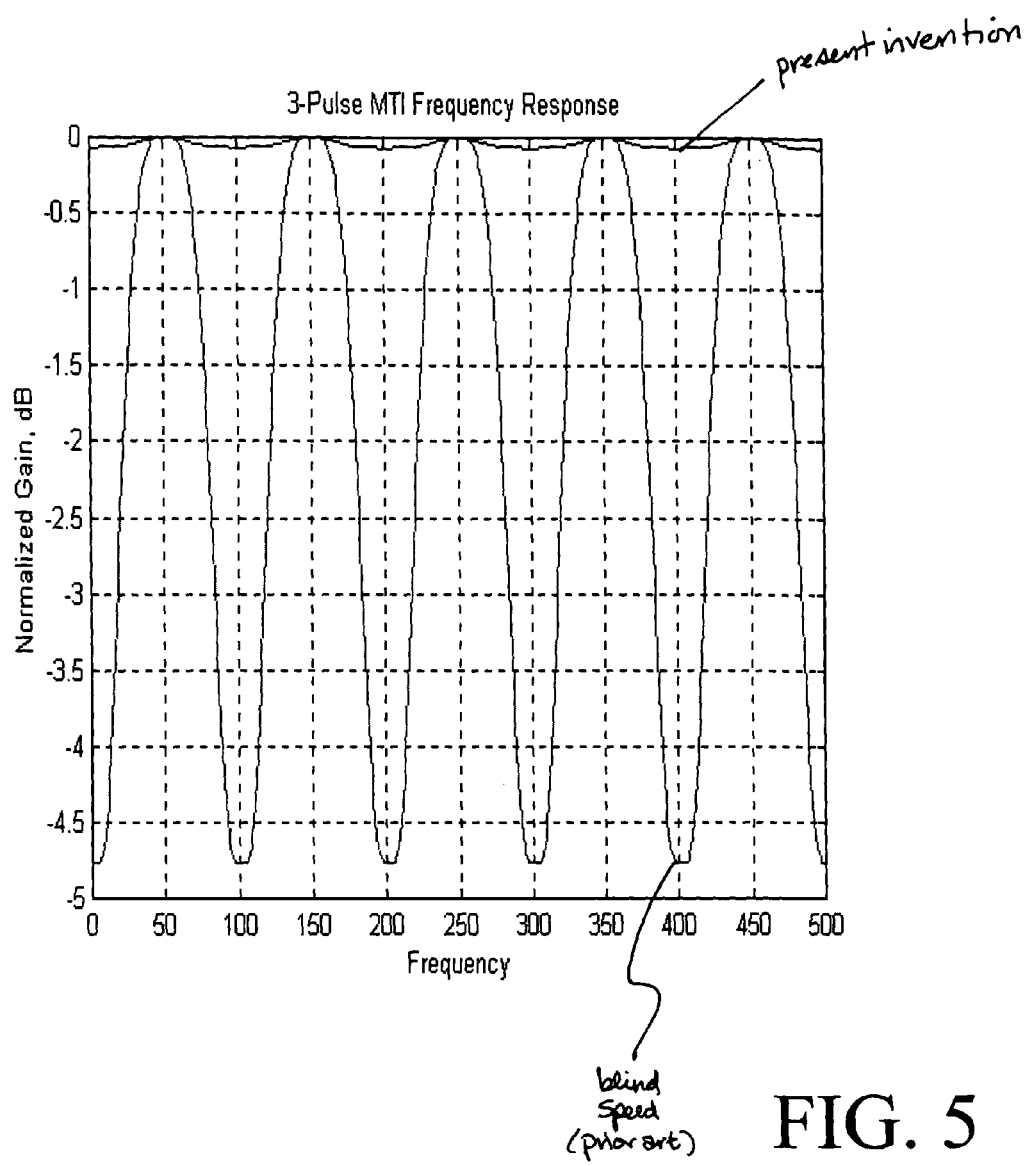
FIG. 5 is a comparative graph showing blind speeds experienced by both a prior art system and the present invention.

An additional feature of the present invention relates to the improvement of MTI processing. FIG. 5 is a comparative graph showing blind speeds experienced by an MTI system and the present invention. As shown in FIG. 5, the present invention results in significant improvement in normalized gain, which significantly improves signal detection capabilities.

C. System

Figure 6:
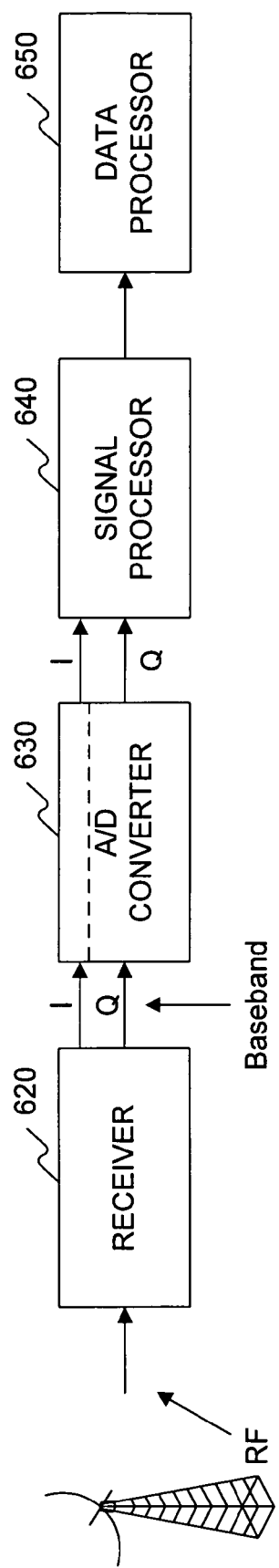
FIG. 6 is a schematic block diagram of a signal processing system consistent with the present invention.

FIG. 6 is a schematic block diagram of a signal processing system consistent with the present invention. As shown in FIG. 6, one embodiment of the present system includes an antenna 610, a receiver 620, an A/D converter 630, a signal processor 640, and a data processor 650.

Antenna 610 collects a modulated signal, such as a radio frequency signal, and passes it to receiver 620. The initial stages of Receiver 620 may comprise a low noise amplifier, an RF mixer, an intermediate frequency (IF) filter, bandpass filter, mixer, low pass filter, optional gain filters, and other equipment capable of changing the signal to a baseband signal. The signal is then coherently processed to resolve it into I and Q components. The signal is then passed to A/D converter 630.

In a system consistent with the present invention, A/D converter 630 is comprised of analog-to-digital processing circuitry and filtering components, as is well understood in the art. A/D converter 630 converts the analog signal into a digital signal at a suitable sampling rate. Any sampling rates may be used provided that appropriate digital signal processing for the particular application is performed. For example, a fast moving radar target may require a higher data rate. For speech, you need only twice the bandwidth of human speech. A/D converter 630 may, in fact, be any standard analog-to-digital converter means capable of receiving an analog electrical signal and outputting a digital signal consistent with the selected sample rate.

Signal processor 640 may be a standard or specialized computer, depending on the application, implementing the method of the present invention. Signal processor 640 may be any commonly available digital processor such as, for example, a Pentium. Signal processor 640 may be a single processor or multiple processors. As described above, the method of the present invention may be implemented in software, hardware, or a combination thereof.

Data processor 650 is a standard computer or special hardware. Data processor 650 could be any commercial or standard computing device, or a specially designed computing device that does decision processing. Data processor 650 may be any commonly available digital processor such as, for example, a Pentium. Data processor 650 may be a single processor or multiple processors. In a radar system, for example, the system would process the resulting signal to detect the presence of the target, and determine its range, velocity, and other target parameters.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or hardware alone. The scope of the invention is defined by the claims and their equivalents.

I claim:

1. A method for improving signal-to-noise ratio of a signal containing noise, the method comprising the steps, performed by a processor, of:
    receiving an analog signal comprising a desired signal and noise;
    obtaining a set of N samples representing digital representations of in-phase (I) and quadrature (Q) components of the analog signal;
    combining the set of N sample with specially selected weighting coefficients;
    combining the weighted sample pairs with a phase-rotated Nth sample; and
    outputting a modified signal, wherein the modified signal is a function of the weighted samples and the phase-rotated Nth sample.

2. The method of claim 1, wherein the step of obtaining in-phase (I) and quadrature (Q) components of the analog signal comprises:
    obtaining a set of N samples comprising in-phase (I) and quadrature (Q) components of the analog signal, wherein each sample pair comprises an in-phase and quadrature component taken at a same time.

3. The method of claim 1, wherein the weighting coefficients are selected from the class of integers known as Mersenne prime numbers.

4. The method of claim 2, wherein the weighting coefficients are consecutive Mersenne prime numbers.

5. The method of claim 1, wherein the steps of combining the N samples with specially selected weighting coefficients and combining the weighted N sample pairs with a phase-rotated Nth sample may be described by $$y_i = x_i \text{ for } i = 1, \ldots, N$$

$$y_i = x_i^* \left( \frac{x_i}{M_1} + \sum_{k=1}^{N-1} \frac{1}{M_{k+1}} y_{i-k} \right) \text{ for } i \geq N$$

wherein x represents the set of N samples, y represents the modified signal, and $x_i^*$ represents the complex conjugate of $x_i$.

6. The method of claim 5, wherein the weighting coefficients, $M_i$, are selected from the class of integers known as Mersenne prime numbers.

7. The method of claim 6, wherein the weighting coefficients are consecutive Mersenne prime numbers.

8. The method of claim 1, wherein the weighting coefficients are binomial coefficients.

9. The method of claim 1, wherein the specially-selected weighting coefficients take on alternate signs.

10. An apparatus for improving signal-to-noise ratio of a signal containing noise, the apparatus comprising:
    means for receiving an analog signal comprising a desired signal and noise;
    means for obtaining a set of N samples representing digital representations of in-phase (I) and quadrature (Q) components of the analog signal;
    means for combining the set of N samples with specially-selected weighting coefficients;
    means for combining the weighted sample pairs with a phase-rotated Nth sample; and means for outputting a modified signal, wherein the modified signal is a function of the weighted samples and the phase-rotated Nth sample.

11. The apparatus of claim 10, wherein the means for obtaining in-phase (I) and quadrature (Q) components of the analog signal comprises:
means for obtaining a set of N samples comprising in-phase (I) and quadrature (Q) components of the analog signal, wherein each sample pair comprises an in-phase and quadrature component taken at a same time.

12. The apparatus of claim 10, wherein the weighting coefficients are selected from the class of integers known as Mersenne prime numbers.

13. The apparatus of claim 11, wherein the weighting coefficients are consecutive Mersenne prime numbers.

14. The apparatus of claim 10, wherein the means for combining the N samples with specially-selected weighting coefficients and means for combining the weighted N sample pairs with a phase-rotated Nth sample may be described by $$y_i = x_i \text{ for } i = 1, \ldots, N$$

$$y_i = x_i^* \left( \frac{x_i}{M_1} + \sum_{k=1}^{N-1} \frac{1}{M_{k+1}} y_{i-k} \right) \text{ for } i \geq N$$

wherein x represents the set of N samples, y represents the modified signal, and $x_i^*$ represents the complex conjugate of $x_i$.

15. The apparatus of claim 14, wherein the weighting coefficients, $M_i$, are selected from the class of integers known as Mersenne prime numbers.

16. The apparatus of claim 15, wherein the weighting coefficients are consecutive Mersenne prime numbers.

17. The apparatus of claim 10, wherein the weighting coefficients are binomial coefficients.

18. The apparatus of claim 10, wherein the specially-selected weighting coefficients take on alternate signs.

19. A signal processing system comprising:
a sensor capable of receiving an analog signal;
an analog-to-digital converter for obtaining a set of N digital samples comprising in-phase (I) and quadrature (Q) components of the analog signal;
a processor configured to perform the steps of:
combining the set of N digital samples with specially-selected weighting coefficients and a phase-rotated Nth sample, and
outputting a modified signal, wherein the modified signal is a function of Nth weighted samples and the phase-rotated th sample; and
a signal processing device.

20. The apparatus of claim 19, wherein the processor is further configured to combine the set of N digital samples with specially-selected weighting coefficients and a phase-rotated Nth sample according to the following:

$$y_i = x_i \text{ for } i = 1, \ldots, N$$

$$y_i = x_i^* \left( \frac{x_i}{M_1} + \sum_{k=1}^{N-1} \frac{1}{M_{k+1}} y_{i-k} \right) \text{ for } i \geq N$$

wherein x represents the set of N samples, y represents the modified signal, and $x_i^*$ represents the complex conjugate of $x_i$.

21. The method of claim 20, wherein the weighting coefficients, $M_i$, are selected from the class of integers known as Mersenne prime numbers.

22. The method of claim 21, wherein the weighting coefficients are consecutive Mersenne prime numbers.

23. The method of claim 19, wherein the weighting coefficients are binomial coefficients.

24. The method of claim 19, wherein the specially-selected weighting coefficients take on alternate signs.

* * * * *